United States Patent Office 3,647,829
Patented Mar. 7, 1972

3,647,829
PROCESS FOR THE PREPARATION OF
3α-HYDROXY-5β-PREGNAN-20-ONE
Gunther Kruger, St. Laurent, Quebec, Canada, assignor to Steele Chemicals Company Limited, Ville St. Pierre, Quebec, Canada
No Drawing. Filed Dec. 2, 1969, Ser. No. 881,604
Claims priority, application Canada, Nov. 5, 1969, 066,775
Int. Cl. C07c 169/32
U.S. Cl. 260—397.4
11 Claims

ABSTRACT OF THE DISCLOSURE

Process for the preparation of 3α-hydroxy-5β-pregnan-20-one by the selective hydrogenation of a member selected from the group consisting of the Δ⁴-3-ketosteroids progesterone, spirost-4-en-3-one and stigmasta-4,22-dien-3-one to form the corresponding 3-keto-5β-setroids, followed by the selective reduction of the latter ketone to the corresponding 3α-hydroxy-5β-steroid. When progesterone is used as the starting material, the desired product, 3α-hydroxy-5β-pregnan-20-one, is obtained directly; when spirost-4-en-3-one, or stigmasta-4,22-dien-3-one is used as the starting material, the desired product is obtained by subsequent degradation of side chain attached to the D-ring of the steroid nucleus. The process is very economical and results in high yields of the end product.

---

The present invention provides a new process for the manufacture of 3α-hydroxy-5β-pregnan-20-one.

The product 3α-hydroxy-5β-pregnan-20-one is well known in the art, and has been reported to have great pharmaceutical value as a hypnotic-anaesthetic agent (L. Gyermek et al., J. Med. Chem., 11, 117 (1968)). It has the formula:

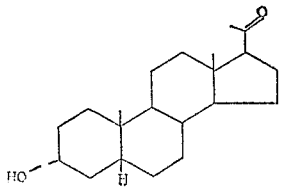

(V)

Several different processes are known in the art for preparing 3α-hydroxy-5β-pregnan-20-one; see for example Canadian Pats. 370,634 (Butenandt et al.) and 410,111 (Marker); and also U.S. Pats. 2,156,275 (Butenandt) and 2,223,377 (Marker). Such prior art process teachings are relatively complicated, difficult to perform and uneconomical.

In a more recent process, preferred by Gyermek et al. (see above), progesterone is reduced with palladium in 5% ethanolic potassium hydroxide to yield an impure product, containing, in addition to the desired 5β-pregnane-3,20-dione (IV), considerable amounts of the isomeric 5α-pregnane-3,20-dione and other compounds. Separation of the desired isomer (IV) from this mixture is difficult and thus the latter is reduced to a mixture, consisting essentially of isomeric diols, from which 3β,20β-dihydroxy-pregnane can then be isolated after several recrystallizations. Subsequent oxidation of the latter dihydroxypregnane affords the dione (IV) which is treated with lithium tri-tert.-butoxyaluminium hydride during 48 hours to yield (V) after chromatography. This process involves four steps, and the desired product is obtained in relatively low yield.

With the method of this invention, 3α-hydroxy-5β-pregnan-20-one can be manufactured in a considerably more simple and cheaper manner in greatly improved yields.

More particularly, the process of this invention involves the highly selective hydrogenation of a member selected from the group consisting of progesterone (I)

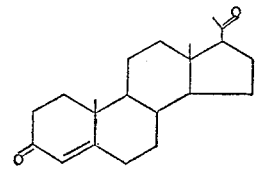

(I)

spirost-4-en-3-one (II),

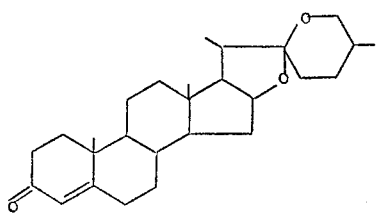

(II)

and stigmasta-4,22-dien-3-one (III),

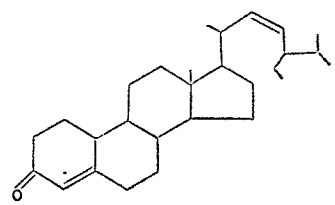

(III)

the selective hydrogenation of said nucleus being carried out with palladium in the presence of tert.-butylamine, and thereafter selectively reducing the resulting 3-keto-5β-steroid to form the corresponding 3α-hydroxy-5β-steroid; and when the starting material is either (II) or (III), the 3α-hydroxy-5β-steroid compound having a side chain attached to the D-ring of the steroid nucleus is subsequently degraded. The process of the present invention can be illustrated as follows:

EMBODIMENT A

Progesterone

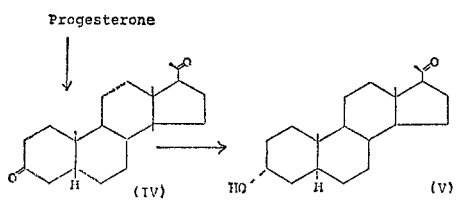

EMBODIMENT B

Spirost-4-en-3-one

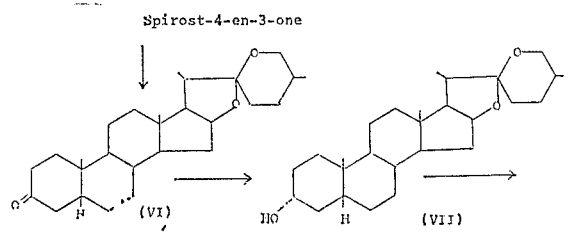

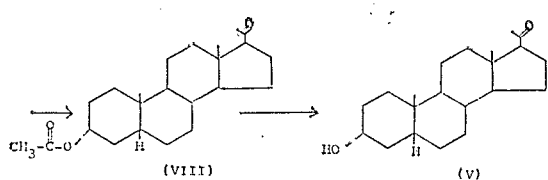

EMBODIMENT C

Stigmasta-4,22-dien-3-one ⟶

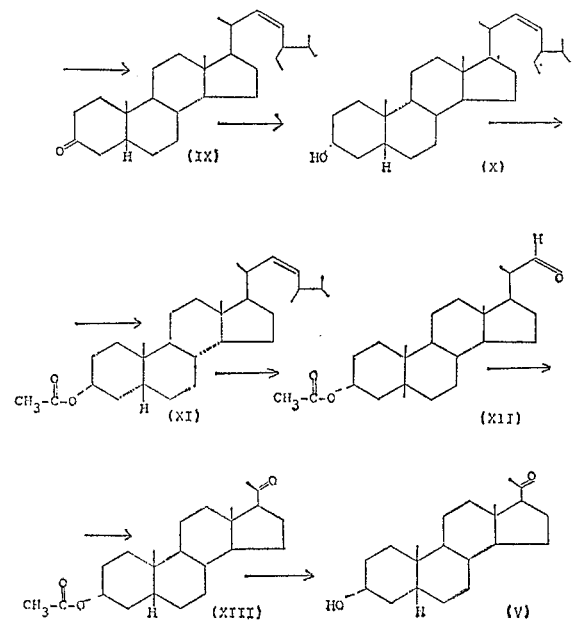

It is a novel feature of the present invention that the hydrogenation of progesterone, spirost-4-en-3-one or stigmasta-4,22-dien-3-one is carried out using palladium in the presence of tert.-butylamine. By using this particular feature, it has unexpectedly been found that the above $\Delta^4$-3-ketosteroids afford the corresponding 3-keto-5$\beta$-steroids in a greatly improved yield and purity, as well as in a greatly simplified and more economical manner as compared to prior art techniques. Thus, for example, using progesterone as the starting material, the above process enables the preparation of 3$\alpha$-hydroxy-5$\beta$-pregnan-20-one from progesterone (I) in a yield at least four times as high as that obtained by the Gyermek et al. above method; and the direct conversion of progesterone (I) to (IV) in high yield by a highly selective method of hydrogenation.

In a particularly preferred embodiment of the above process, a solution of the starting material e.g. progesterone, in tert.-butylamine, is shaken between about 40 to about —40° C., preferably at room temperature, in an atmosphere of hydrogen at a pressure between 0.1 and 3 atmospheres, preferably at 0.5–1 atmosphere, in the presence of palladium. The palladium is preferably supported on a carrier, for example charcoal. Using a catalyst consisting of 5% of palladium on charcoal, 0.01 to 1 g. of catalyst may be employed per gram of progesterone. The reaction mixture is then worked up by conventional techniques, e.g. the catalyst may be removed by filtration, and the tert.-butylamine (B.P. 45° C.) may be removed and recovered by distillation. The residue which, when progesterone is used as the starting material, contains 5$\beta$-progestan-3,17-dione (IV) as practically the only steroidal material, may if desired be purified by digestion with ether.

In a particularly preferred embodiment of the present invention, the hydrogenated 3-ketone product is then reduced to the 3$\alpha$-hydroxy-5$\beta$-pregnan-20-one by employing lithium aluminum hydride, pretreated with tert.-butanol. In carrying out the reduction, there is provided the advantage that, as compared to the Gyermek et al. process, the expensive lithium tri-tert.-butoxyaluminium hydride is replaced by a much smaller relative amount of the cheaper lithium aluminium hydride and the reaction time is shortened greatly.

The hydrogenated starting material of the first step, obtained in high yields, is sufficiently pure so as to permit its reduction in the next step, without further purification procedures. In carrying out the reduction, finely powdered lithium aluminium hydride is treated with an excess of tert.-butyl alcohol for a period of time ranging from 5 to 120 minutes and until hydrogen evolution has ceased. The dione (IV), optionally dissolved in a minimum of tetrahydrofuran, is then treated with the above mixture which is considered to contain essentially lithium tri-tert.-butoxyaluminium hydride as the main reducing agent. Additional amounts of the above reducing mixture may optionally be added subsequently. The reduction is very fast and is generally complete 10 minutes after the addition of the reducing mixture. It is an advantage of the reduction step that, unexpectedly, the reduction of the 3-ketone (IV) to the 3$\alpha$-hydroxy-5$\beta$-pregnan-20-one (V) can be carried out in the presence of large amounts of tert.-butanol, since this makes the isolation of lithium tri-tert.-butoxyaluminium hydride from the mixture, from the treatment of lithium aluminium hydride with tert.butanol, unnecessary and results in a considerable saving of time and labour. Generally in reduction with lithium aluminium hydride and lithium alkoxyaluminium hydrides, such as lithium tri-tert.-butoxyaluminium hydride, ethers, such as tetrahydrofuran or diethyl ether, are preferred as solvents, and hydroxylic solvents such as tert.-butanol, are avoided. It is a further advantage that unexpectedly the use of the mixture resulting from treatment of lithium aluminium hydride and tert.-butanol reduces the ketone (III) much more rapidly than is the case in the Gyermek et al. procedure in which solid lithium tri-tert.-butoxyaluminium hydride was employed. Working up of the reaction mixture proceeds in the conventional manner, e.g. by addition of dilute hydrochloric acid and concentration followed by filtration or extraction. From the product obtained, 3$\alpha$-hydroxy-5$\beta$-pregnan-20-one is isolated by chromatography and crystallization.

The starting materials spirost-4-en-3-one and stigmasta-4,22-dien-3-one are readily obtainable according to conventional oxidation procedures of diosgenin and stigmasterol respectively. The starting material progesterone is well known and readily available in the art.

When spirost-4-en-3-one or stigmasta-4,22-dien-3-one is employed as the starting material, and following the selective hydrogenation and reduction steps described above, the resulting intermediates obtained—i.e. the 3$\alpha$-hydroxy-5$\beta$-spirostan (Formula VII) or the 3$\alpha$-hydroxy-5$\beta$-stigmast-22-en (Formula X) may be converted into 3$\alpha$-hydroxy-5$\beta$-pregnan-20-one according to well known procedures as described, for example, by Fieser and Fieser, Steroids, Reinhold Publishing Corp., New York, 1967, p. 549 and p. 554, respectively.

Briefly summarized, the conversion of 3$\alpha$-hydroxy-5$\beta$-spirostan (VII) is carried out by first subjecting the latter intermediate to acetolysis, whereafter the intermediate obtained is oxidized using, for example, chromium trioxide to form the corresponding 20-ketone steroid, whereafter the substituted side chain in position 16 is eliminated— e.g. by heating in acetic acid, and the resulting double bond at position 16 is thereafter hydrogenated. Finally the acetoxy group in position 3, which formed during the acetolysis step, is hydrolyzed.

The conversion of 3$\alpha$-hydroxy-5$\beta$-stigmast-22-ene is carried out by first converting the 3$\alpha$-hydroxy group into the acetate and then oxidizing the double bond in position 22, e.g. by ozone, to yield 3$\alpha$-hydroxy-5$\beta$-pregnan-20$\beta$-carboxaldehyde (XII) which after conversion into its enol acetate or into an enamine, yields the desired 3$\alpha$-hydroxy-5$\beta$-pregnan-20-one on subsequent oxidation and hydrolysis of the 3-acetate (XIII).

The spirost-4-en-3-one and stigmasta-4,22-dien-3-one represent very economical starting materials; and have the further advantage that in their chemical transformation to 20-ketone (V) the keto group in position 20 is only generated after the hydrogenation of the double bond at position 4 and the reduction of the 3-keto group. Undesirable hydrogenations or reductions in position 20, such as the conversion of the 20-keto group to a 20-alcohol, are thus prevented.

Having thus generally described the invention, reference will now be made to the following examples, illustrating preferred embodiments only.

Example I

A solution of 5.0 g. progesterone in 100 ml. tert.-butylamine was shaken in an atmosphere of hydrogen at room temperature and atmospheric pressure in the presence of 1.25 g. of 5% palladium on carbon for 16 hours. The catalyst was filtered off and the filtrate was concentrated to a thick paste at reduced pressure. Petroleum ether was added and the mixture was again concentrated. Cooling to 0° C. and filtration gave 4.23 g. of 5β-pregnane-3,20-dione, M.P. 116°–119° C.

Example II

To 26.7 ml. of tert.-butanol was added 0.24 g. of finely powdered lithium aluminium hydride. The mixture was stirred at room temperature and under nitrogen for one hour, whereupon a solution of 2.0 g. of 5β-pregnane-3,20-dione in 10.0 ml. tetrahydrofuran was added in one lot. After 100 minutes of stirring under nitrogen a mixture of 0.048 g. lithium aluminium hydride and 5.34 ml. of tert.-butanol, which had been shaken under nitrogen for 1.5 hours, was added; after 170 minutes the same amount of the latter mixture was added. After 180 minutes 37.4 ml. of concentrated hydrochloric acid-water 1:10 was added, followed by 95 ml. of benzene. The mixture was concentrated at reduced pressure. A crystalline cake formed which was filtered off, dried and chromatographed on 100 g. of aluminium oxide. Elution with ethyl acetate-benzene 1:9 gave a material, which after recrystallization from ether-petroleum ether, yielded 0.79 g. of 3α-hydroxy-5β-pregnan-20-one, M.P. 149–151° C.

I claim:

1. In a process of hydrogenating a member selected from the group consisting of progesterone, spirost-4-en-3-one and stigmasta-4,22-dien-3-one, to form the corresponding 3-keto-5β-steroid, the improvement comprising carrying out said hydrogenation using palladium in the presence of tert.-butylamine.

2. A process of preparing 3α-hydroxy-5β-pregnan-20-one comprising selectively hydrogenating a member selected from the group consisting of progesterone, spirost-4 - en - 3 - one and stigmasta - 4,22 - dien - 3 - one, said hydrogenation being carried out using palladium in the presence of tert.-butylamine, to form the corresponding 3-keto-5β-steroid, and reducing the ketone to form the corresponding 3α-hydroxy-5β-steroid, and when said member is spirost-4-en-3-one or stigmasta-4,22-dien-3-one, subjecting the 3α-hydroxy-5β-steroid obtained to degradation of the D-ring of the steroid nucleus.

3. A process as defined in claim 2, comprising selectively hydrogenating progesterone using palladium in the presence of tert.-butylamine to form 5β-pregnane-3-20-dione, and selectively reducing the latter compound.

4. A process as defined in claim 2, wherein the reduction is carried out in tert.-butanol using lithium aluminium hydride pretreated with tert.-butanol.

5. A process as defined in claim 1, wherein the hydrogenation is carried out at a temperature between about 40 to about —40° C.

6. A process as defined in claim 2, wherein the hydrogenation is carried out at a pressure of between .1 and 3 atmospheres.

7. A process as defined in claim 2, wherein the reduction is carried out in the presence of an inert cosolvent.

8. A process as defined in claim 2, comprising, hydrogenating progesterone using palladium in the presence of tert.-butylamine at a temperature of between about 40 to about —40° C. and at a pressure of between .1 and 3 atmospheres, thereby producing 5β-pregnane-3,20-dione, and reducing the latter compound using lithium aluminium hydride pretreated with tert.-butylamine, the reduction being carried out in the presence of an inert solvent.

9. A process as defined in claim 2, wherein following reduction, the product is isolated by chromatography and crystallization from the reaction mixture.

10. A process as defined in claim 2, wherein said member is spirost-4-en-3-one, and wherein the 3α-hydroxy-5β-steroid obtained after reduction is subjected to acetolysis thereby to form the corresponding 3α-acetoxy-5β-steroid, the last-mentioned compound is oxidized to form the corresponding 20-ketone steroid, treating said 20-ketone steroid to eliminate the 16-substituted side chain thereof, hydrogenating the double bond at position 16 of the resulting intermediate, and hydrolysing the 3α-acetoxy group of the hydrogenated intermediate.

11. A process as defined in claim 2, wherein said member is stigmasta-4-en-3-one, and wherein the 3α-hydroxy group of the 3α-hydroxy-5β-steroid obtained after reduction is converted into the corresponding acetate, the latter intermediate is oxidized to form 3α - hydroxy-5β-pregnan-20β-carboxaldehyde, converting said last-mentioned compound into the corresponding enol acetate or enamine derivative, oxidizing said derivative to form the corresponding 20-ketone compound, and hydrolysing the 3α-acetate group of said 20-ketone compound.

No references cited.

ELBERT L. ROBERTS, Primary Examiner

U.S. Cl. X.R.

260—239.55 A, 397.2, 397.3